United States Patent [19]

Lea et al.

[11] 4,149,919
[45] Apr. 17, 1979

[54] METHOD OF MAKING A SELF-INFLATING AIR MATTRESS

[76] Inventors: James M. Lea, 1207 NW. Culbertson, Seattle, Wash. 98177; Neil P. Anderson, 3105 N. 29th St., Tacoma, Wash. 98407

[21] Appl. No.: 800,288

[22] Filed: May 25, 1977

Related U.S. Application Data

[63] Continuation-in-part of Ser. No. 531,301, Dec. 12, 1974, Pat. No. 4,025,974, which is a continuation-in-part of Ser. No. 216,702, Jan. 10, 1972, Pat. No. 3,872,525.

[51] Int. Cl.² ............................................. A47C 27/08
[52] U.S. Cl. ............................................. 156/213; 5/365; 5/367; 5/368; 9/11 A; 9/13; 156/245; 156/267; 156/285; 156/292; 156/286; 156/300; 156/309; 156/311; 156/344; 428/71; 428/76; 428/157; 428/158; 428/246; 428/261; 428/311
[58] Field of Search ............... 156/87, 118, 120, 156, 156/163, 213, 212, 215, 285, 286, 267, 292, 300, 309, 311, 78, 344, 250, 245; 428/71, 76, 157, 158, 311, 315, 246, 289, 261, 212; 5/365, 367, 368; 9/13, 11 A; 150/8; 264/88, 89, 94, 96, 46.8; 29/421 R

[56] References Cited

U.S. PATENT DOCUMENTS

| 1,908,682 | 5/1933 | Bronson | 156/156 |
|---|---|---|---|
| 2,698,273 | 12/1954 | Miner et al. | 156/285 |
| 2,997,100 | 8/1961 | Morris | 5/367 |
| 3,322,601 | 5/1967 | Wong et al. | 156/286 |
| 3,378,864 | 4/1968 | Cornes | 9/11 A |
| 3,462,330 | 8/1969 | Greig et al. | 156/285 |
| 3,466,214 | 9/1969 | Polk et al. | 156/213 |
| 3,537,116 | 11/1970 | Kain | 5/367 |
| 3,567,536 | 3/1971 | Wickersham | 156/309 |
| 3,619,344 | 11/1971 | Wolinski et al. | 156/309 |
| 3,620,863 | 11/1971 | Sullhofer | 156/309 |
| 3,645,012 | 4/1972 | Schlager | 156/285 |
| 3,668,032 | 6/1972 | Bunting et al. | 156/215 |
| 3,779,847 | 12/1973 | Turner | 156/156 |
| 3,817,803 | 6/1974 | Horsky | 156/85 |
| 3,818,823 | 6/1974 | Bond | 156/285 |
| 3,849,225 | 11/1974 | Haertle | 156/213 |
| 3,864,766 | 2/1975 | Frete | 5/365 |
| 4,025,794 | 5/1977 | Lea et al. | 156/285 |
| 4,049,854 | 9/1977 | Casey et al. | 156/290 |

*Primary Examiner*—Jerome W. Massie

[57] ABSTRACT

Two sheets of an air impermeable plastic coated fabric are placed horizontally, with a core of a resilient open cell foam material positioned between the two sheets. Heated platens are applied to this layup, followed by applying a vacuum to the interior, cooling the assembly, and then moderately pressurizing the then bonded assembly.

10 Claims, 25 Drawing Figures

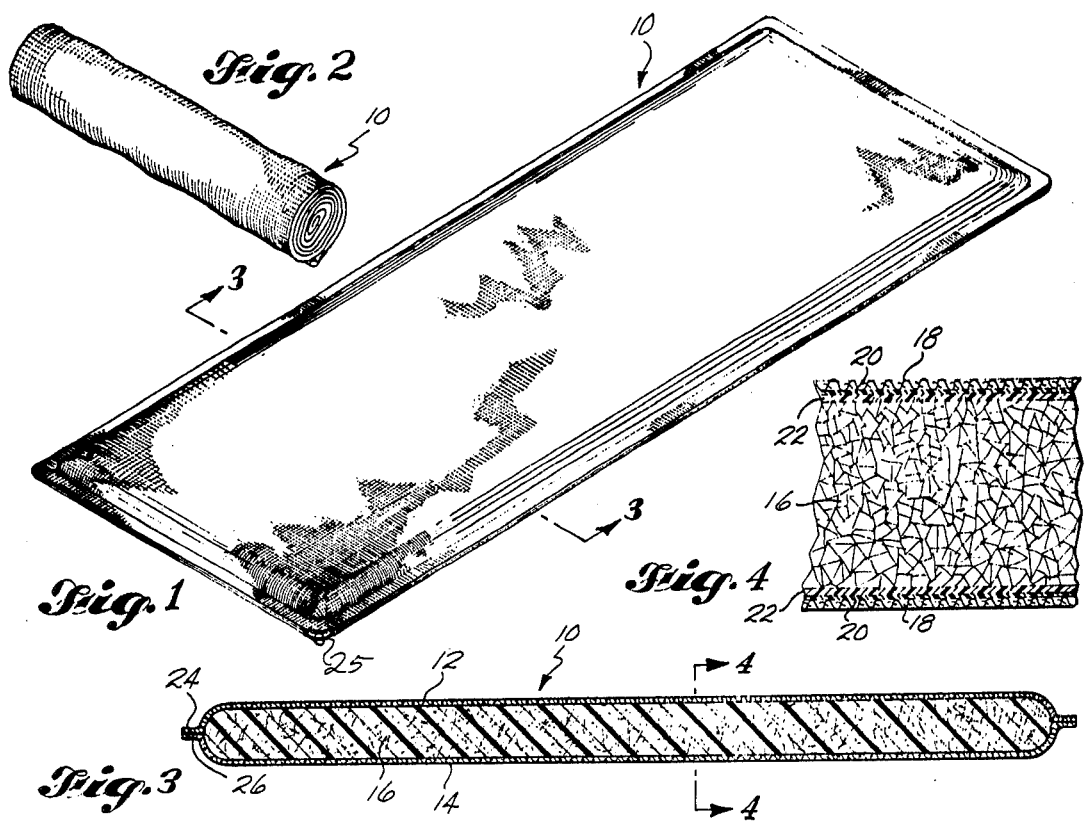
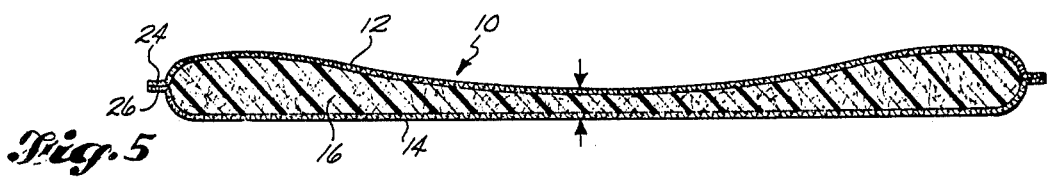
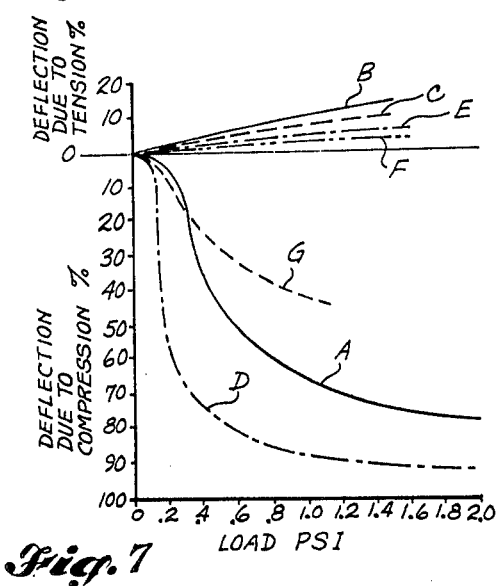
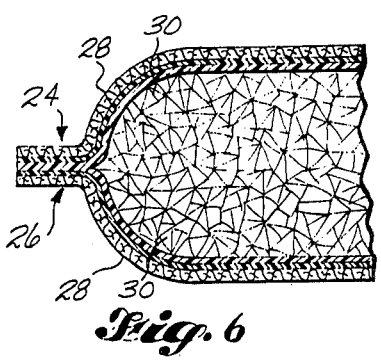

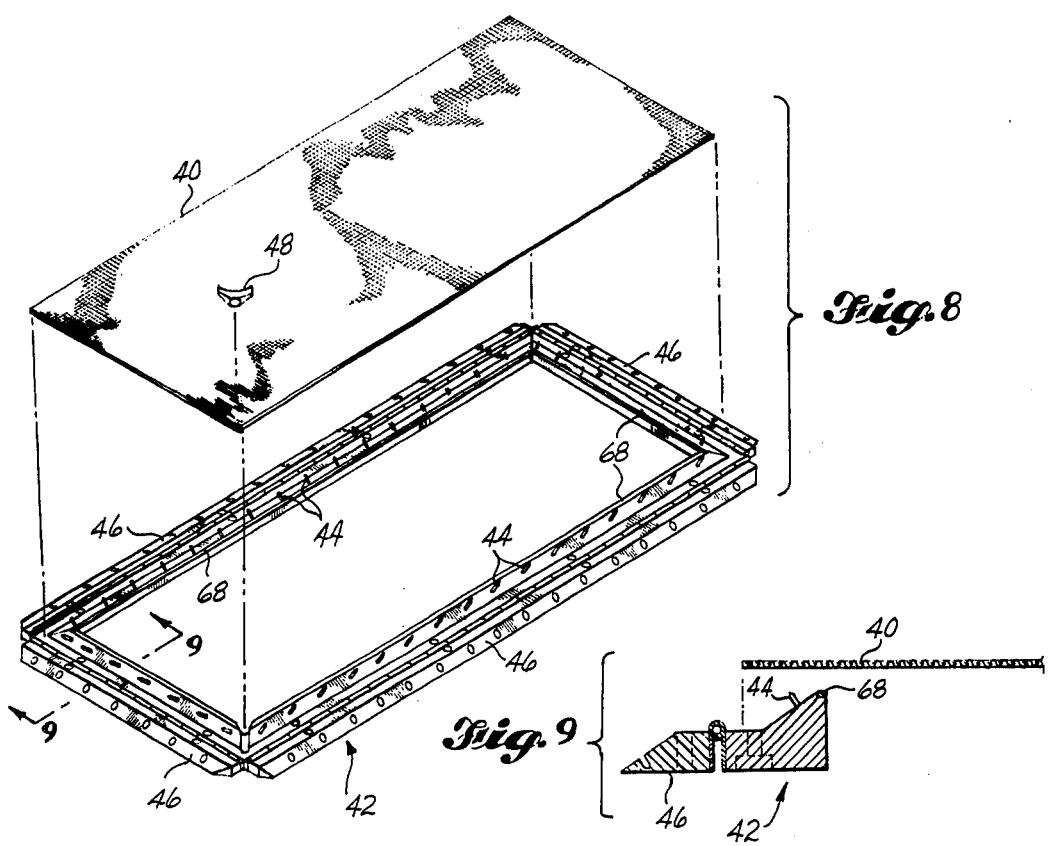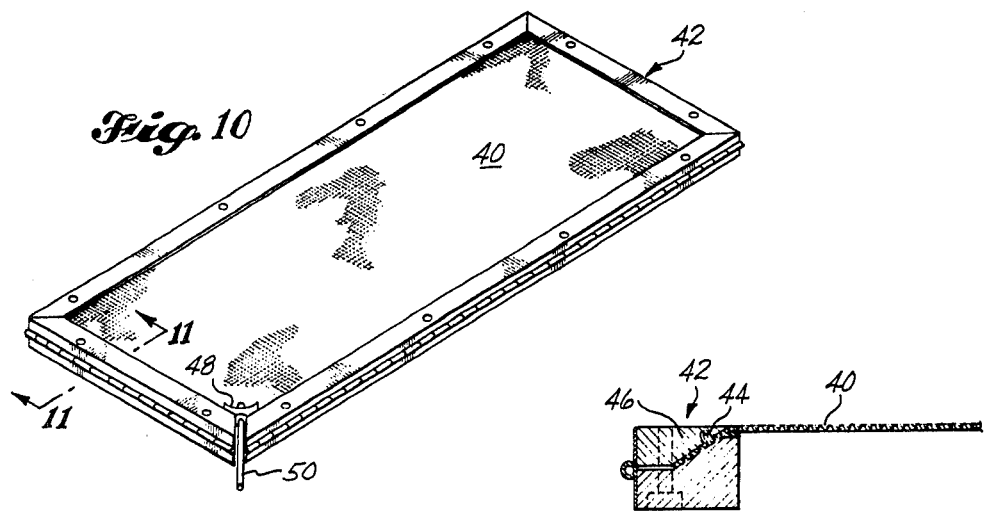

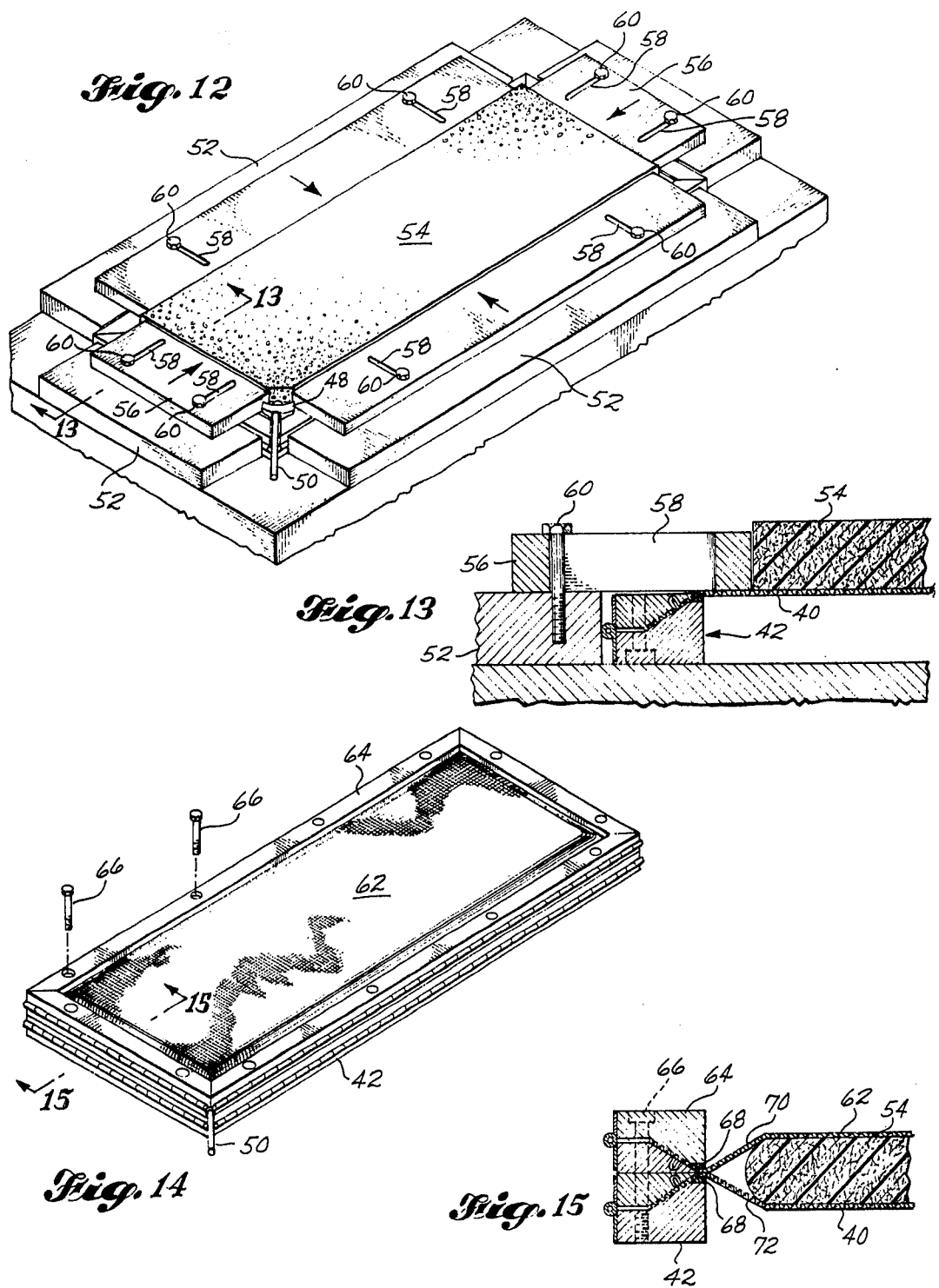

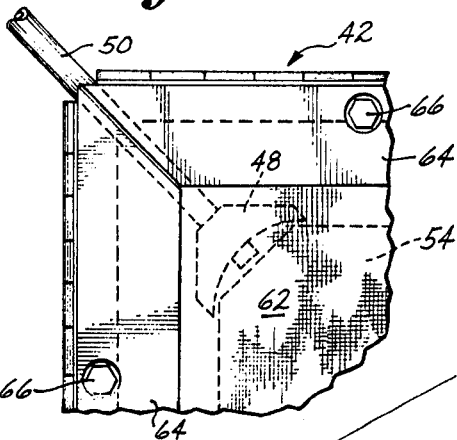
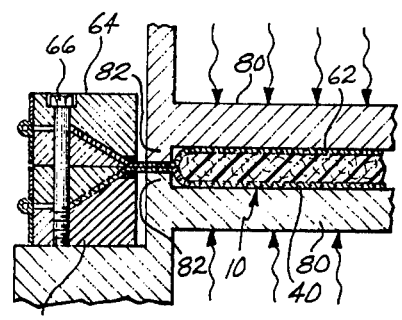
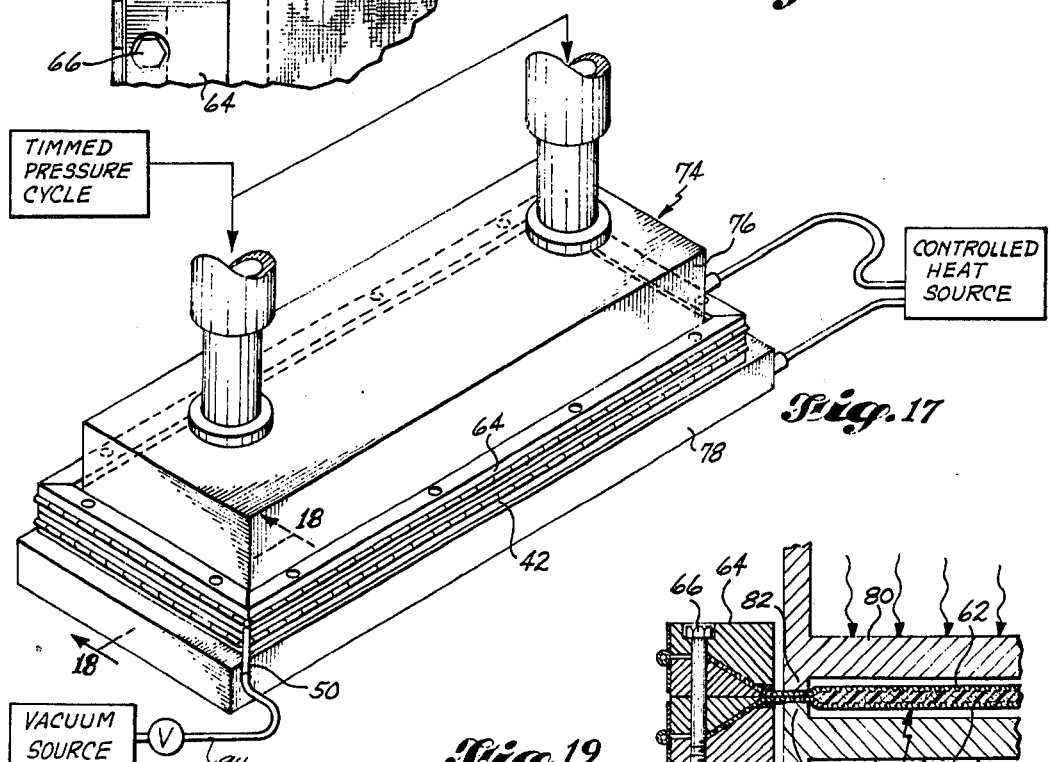
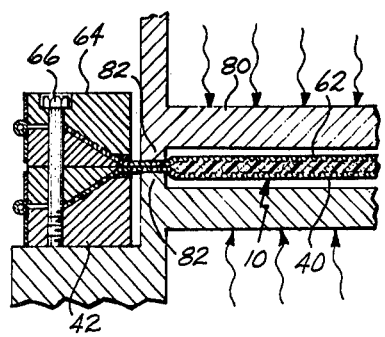
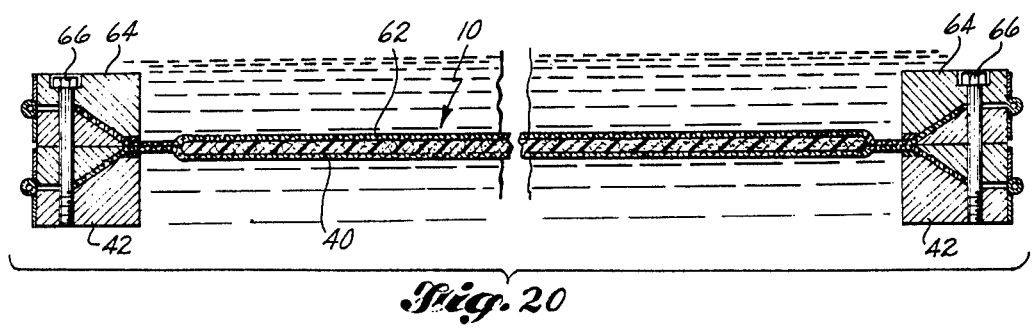

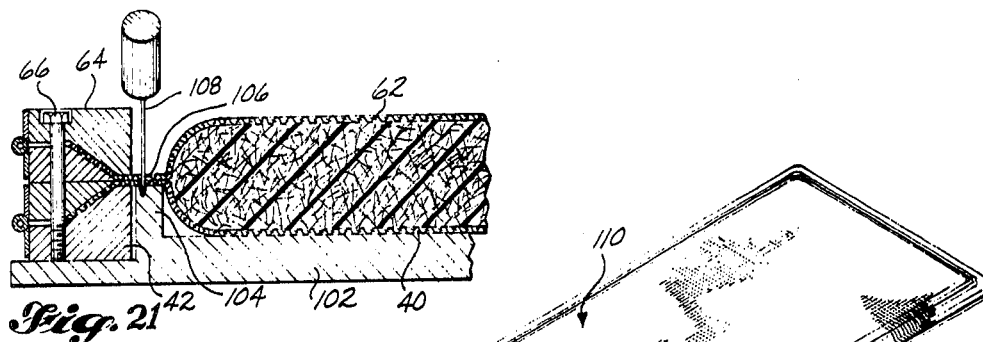
Fig. 21
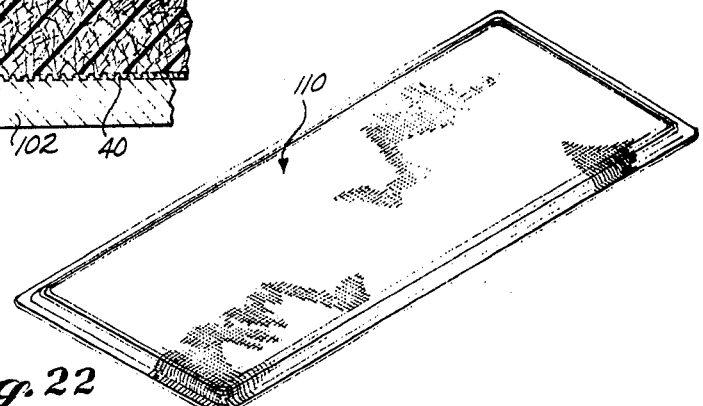
Fig. 22
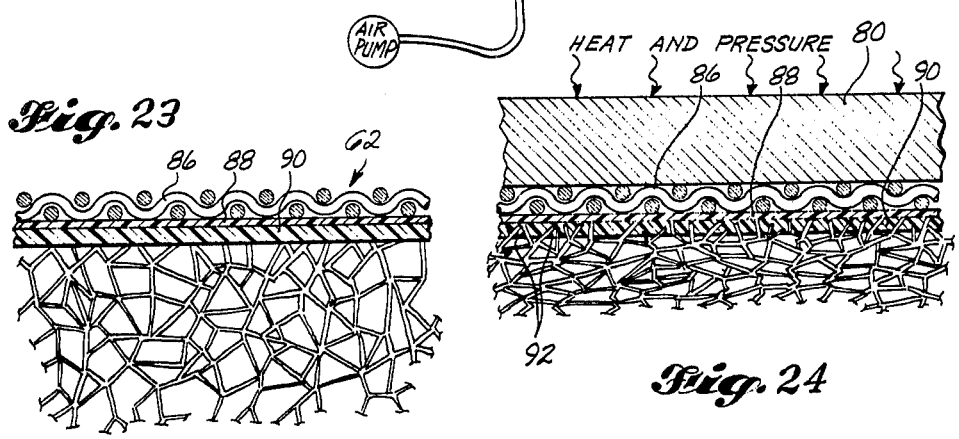
Fig. 23
Fig. 24
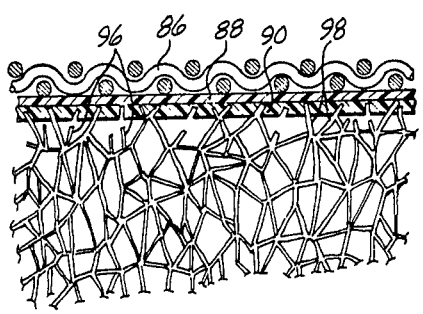
Fig. 25

METHOD OF MAKING A SELF-INFLATING AIR MATTRESS

CROSS REFERENCE TO RELATED APPLICATIONS

This is a continuation-in-part application of U.S. Patent Application Ser. No. 531,301, filed Dec. 12, 1974, now U.S. Pat. No. 4,025,974, and entitled AIR MATTRESS AND METHOD OF MAKING THE SAME, which was a continuation-in-part application to our then pending U.S. patent application, entitled "INFLATABLE FOAM PAD", Ser. No. 216,702, filed Jan. 10, 1972, now issued as U.S. Pat. No. 3,872,525.

BACKGROUND OF THE INVENTION

1. Field of the Invention

The present invention relates to a method of making a self-inflating air mattress.

2. Description of the Prior Art

Since air mattresses are commonly used by campers who are backpacking their supplies and camping gear to a remote site, it is highly desirable that an air mattress be lightweight, compact, reliable and convenient. A quite common type of air mattress is one made up of a plurality of interconnected inflatable tubes arranged in the rectangular configuration of a mattress. Because of the inconvenience of inflating such an air mattress at the campsite, and also because of the discomfort that results from the air mattress being deflated by an accidental puncture at a remote campsite, many campers have abandoned the concept of an inflatable air mattress and have gone to a rectangular sheet of compressible plastic foam material for use as a mattress. This foam material can be rolled up into a reasonably compact package, and yet while being resilient, it has sufficient resistance to compression to provide reasonable comfort for a person lying thereon (at least by the standards of packpackers who travel to remote campsites). For the foam to have sufficient resistance to compression to provide an adequate degree of comfort, quite commonly a foam having a 25% ILD (indentation load deflection) of at least about 35 pounds is selected. Often, a more dense foam material is used to give greater resistance to compression, i.e., in the range of 2.75 pounds per cubic foot or greater. However, as higher compression resistance foams are used to give more support, the foam pad becomes more difficult to roll up and in some cases more weight is added to the backpacker's load.

With the inflatable air mattress and the foam pad each having it own particular advantages, it has been attempted in the prior art to combine both constructions into one article. One such mattress is shown in the Swiss Pat. No. 428,124, this mattress comprising an outer rectangular shaped air impervious envelope and an interior foam core. The patent notes that the air mattress can be compressed into a stowed position (i.e., rolled up to a relatively small volume), after which the inflating valve of the air mattress is closed to maintain the mattress in its compact stowed configuration. When the valve is opened, the force of the foam core causes the mattress to self-inflate to its expanded position, after which the valve is closed to contain the entrapped air. The patent also notes that the foam core, in addition to providing the self-inflating characteristic of the mattress, also functions as a foam pad to provide support as "emergency upholstery" in the event that the outer covering develops a leak. Thus, the essential construction of the air mattress of this Swiss patent is an interior foam pad having sufficient resistance to compression to provide some reasonable degree of support to a person lying thereon, enclosed by an airtight envelope that functions as an inflatable air mattress.

A somewhat related concept is disclosed in U.S. Pat. No. 2,997,100, where there is shown a foam filled mattress of a design more commonly used for a conventional household bed. The envelope of this mattress is airtight and can be inflated to a desired pressure, with the air pressure providing a certain degree of additional support for a heavier person. The patent notes that this solves the problem of being able to provide reasonable consistency of firmness of the mattress for persons of greatly differing weights. Thus, the overall structure of this mattress utilizes the supporting force provided by the compression resistance of the foam core, with the foam core having sufficient pressure resisting quality to provide a reasonable degree of support in compression loading.

A more recent approach to providing a self-inflating, foam filled air mattress is disclosed in U.S. Pat. No. 3,798,686. In this patent the resistance of the foam core to compression is utilized in the same manner as the mattress of the above-mentioned Swiss patent to give the air mattress its self-inflating characteristic. However, instead of utilizing the compression resistance of such foam to any great degree to provide support to a person lying on the mattress, this particular mattress depends upon the foam core, in the configuration of a matrix of foam ribs, to provide a tie between the upper and lower skins of the mattress to prevent ballooning of the mattress. The foam core shown in this patent comprises upper and lower continuous sheets of foam, between which are two layers of crossing foam ribs arranged in a lattice. These foam components are all bonded one to another, and the upper and lower layers of foam are bonded to the air impermeable upper and lower skins of the air mattress envelope. Also, the patent specifies the use of a lightweight foam material for the core, having a density in the range of about 0.8 to 1.5 pounds per cubic foot, with an advantageous material being polyether foam of a density of about 1.1 pounds per cubic foot.

By way of further background information, other examples of foam filled structures are disclosed in the following patents: British Pat. No. 984,604; U.S. Pat. No. 1,159,166, Brawner; U.S. Pat. No. 2,834,970, Nappe; U.S. Pat. No. 3,323,151, Lerman; U.S. Pat. No. 3,378,864, Cornes; U.S. Pat. No. 3,537,116, Kain; and U.S. Pat. No. 3,611,455, Gottfried.

While the prior art has recognized the value of using both an inflatable envelope and a foam core in combination, and while the prior art has further recognized the function of the foam acting in compression to provide support, and also as a local tie between upper and lower surfaces of the mattress to prevent ballooning, and has recognized the function of the foam to give the mattress its self-inflating feature, the prior art has failed to recognize how a foam core can be utilized in combination with an air impermeable envelope in a manner to utilize properly the structural and load bearing characteristics of these components to get full value from these components to optimize such qualities as compactness, durability, convenient stowing, and proper utilization of the components of the mattress to provide proper support characteristics of the mattress.

It is an object of the present invention to provide a process for the manufacture of a foam filled air mattress having an optimized configuration with regard to the features noted above.

With regard to prior art relating to the method of the present invention, the following patents are generally related to the making of plastic articles and the like by application of heat and pressure applied either by a vacuum or application of positive pressure. These patents are: U.S. Pat. No. 1,908,682, Bronson; U.S. Pat. No. 2,698,273, Miner et al; U.S. Pat. No. 3,462,330, Greig et al; U.S. Pat. No. 3,654,012, Schlager; U.S. Pat. No. 3,668,032, Bunting et al; and U.S. Pat. No. 3,818,823, Bond.

The following patents are generally related to plastic and/or foam structures of various types. These patents are: U.S. Pat. No. 3,619,344, Wolinski; U.S. Pat. No. 3,779,847, Turner; U.S. Pat. No. 3,817,803, Hirsky; U.S. Pat. No. 3,818,962, Muller-Scherak, and U.S. Pat. No. 3,829,918, Stamberger.

SUMMARY OF THE INVENTION

The self-inflating air mattress made by the process of the present invention comprises an air impervious envelope made of substantially non-stretchable flexible material, and comprising top and bottom sheets joined to one another at the perimeter portions thereof. An inflating valve is mounted to the envelope. Positioned within the envelope is a resilient open cell foam core having a planar configuration, with length and width dimensions substantially in excess of its thickness dimension. The foam material is characterized in that it has a density no greater than about 1.5 pounds per cubic foot and desirably no greater than about 1.2 pounds per cubic foot, with the preferred range being between about 0.5 to 1.2 pounds per cubic foot. The foam core material has a 25% ILD (indentation load deflection) of no greater than about 25 pounds, and desirably in the range of 6 to 18 pounds. The compression set of the foam core material is not greater than about 10%, and desirably no greater than about 5%.

The foam core is substantially continuous throughout the envelope and has substantially its entire upper and lower surfaces securely bonded to the upper and lower sheets of the envelope. This enables the foam core to act effectively in tension between the upper and lower sheets to limit expension of the upper and lower sheets away from each other so that sufficient air pressure is maintained to support a person lying on the mattress. The foam has compression characteristics such that the mattress can easily be rolled up into its stowed position, and yet has proper self-inflating characteristics. With the construction of this air mattress, it is possible to make the thickness of the foam as low as about one and a half inches and yet obtain proper support and comfort for a person lying on the mattress. Thicker foam cores can be used, but unnecessarily add bulk and do not provide a significantly greater degree of comfort.

The perimeter of the air mattress is formed in a "T" joint, where the upper and lower sheets are joined one to another at their inner surfaces to form a circumferentially outwardly extended bonded edge portion. The proximate portions of the upper and lower sheets extending from the bonded edge portion are each in a rounded configuration to place the adjacent portions of foam under compression. This alleviates any tendency of the sheets to delaminate from the foam material at the perimeter portions upon pressurization.

For proper bonding of the foam material to the sheets, each sheet has an inner layer of a thermo-plastic material. The outer layer of each sheet is fabric, and there is an intermediate air impervious layer of a plastic material, which is either thermosetting or a thermo-plastic material with significantly higher melting temperature than the inner layer. Alternately the intermediate layer and the inner layer can be made of the same plastic material which gradually softens over a wider range of temperatures.

In the process of the present invention, a pre-bonding assembly is formed by placing a planar piece of open cell foam material between upper and lower sheets, said sheets being air impermeable and having an inner bonding layer of a thermo-plastic material. A valve housing is positioned between the sheets at one corner thereof. This assembly is simultaneously heated and compressed so as to compress the foam core between the sheets and soften the layers of thermo-plastic material to permit bonding of the perimeter of the sheets, one to the other, and to permit bonding of the sheets to the valve housing. The sheets are then cooled to cause a secure bonding of the assembly. Then the foam core is pressurized to apply an expanding force between the upper and lower sheets to break undesired or weak foam filament bonds from the sheets.

In the preferred form of the process of the present invention, edge portions of the sheets of the pre-bonding assembly are clamped in a perimeter frame to form a frame assembly, which is then placed between heated platens. At least one of the platens (and desirably both of the platens) has a slightly raised peripheral shoulder surrounding the main pressure surface of the platen, to engage edge portions of the two sheets immediately adjacent the edge of the foam material. The two platens are initially brought together to compress the foam material between the sheets, and also to press the edge portions of the sheets together. Then a vacuum is applied to the core material to unload the sheets from the main pressure surfaces of the platens and permit greater pressure to be applied to the perimeter portions of the sheets.

The heated platens are moved apart, and the frame assembly, with the vacuum still being applied to the interior of the assembly, is subjected to cooling. This is conveniently accomplished by momentarily wetting both surfaces of the mattress, or by dipping the entire assembly edgewise into a water tank. Maintaining the vacuum during cooling keeps the hot bonded surfaces from pulling apart until cooled.

Immediately after the cooling step, an air pump is attached to the valve housing of the assembly to moderately pressurize the interior of the assembly (e.g., to about 1.8 psi). This breaks unwanted weaker bonds and applies an extension load to the foam during cooling to enhance extension set or loft of the foam. The frame assembly is then placed on a cutting platform having a raised peripheral flange to engage the bonded perimeter portions of the now bonded assembly. The bonded air mattress is then cut from its peripheral frame, a valve is placed in the valve housing, and the air mattress is again moderately pressurized. Then the valve is closed to maintain the pressure within the mattress, and the mattress is left so pressurized for an extended length of time (e.g., overnight). This insures that a proper extension set is given to the foam to improve compression set characteristics of the foam, and also acts as a quality control technique to insure that the mattress is air impermeable.

BRIEF DESCRIPTION OF THE DRAWINGS

FIG. 1 is a isometric view of an air mattress made by the present invention in its inflated condition;

FIG. 2 is an isometric view of this same air mattress in its stowed position;

FIG. 3 is a transverse sectional view taken along line 3—3 of FIG. 1;

FIG. 4 is a sectional view, drawn to an enlarged scale, taken along line 4—4 and detailing the manner in which the foam core is bonded to sheets of the envelope;

FIG. 5 is a view similar to FIG. 3, but showing the inflated air mattress under compression at the middle portion thereof, as in the situation where a person is resting on the mattress;

FIG. 6 is a sectional view, drawn to an enlarged scale, detailing the structure of the foam and the mattress envelope at the edge portion of the mattress;

FIG. 7 is a graph illustrating the deflection characteristics of various foam material and the mattress under compression and tension loading;

FIG. 8 is an isometric view illustrating an initial step of the process of the present invention in which a first skin section of the air mattress is placed on a first section of a mounting frame;

FIG. 9 is a sectional view taken along line 9—9 of FIG. 8;

FIG. 10 is a isometric view illustrating the sheet of FIG. 8 being clamped to the mounting frame;

FIG. 11 is a sectional view taken along line 11—11 of FIG. 10;

FIG. 12 is an isometric view illustrating the placement of the foam core onto the lower sheet of the assembly;

FIG. 13 is a sectional view taken along line 13—13 of FIG. 12;

FIG. 14 is an isometric view illustrating the placement of a second frame section onto the first section to make an air mattress assembly ready for further processing;

FIG. 15 is a sectional view taken along line 15—15 of FIG. 14;

FIG. 16 is a top plan view illustrating the corner section of the frame of FIG. 14 where the inflating valve housing is located;

FIG. 17 is an isometric view illustrating a heated platen being applied to the air mattress assembly;

FIG. 18 is a sectional view taken along line 18—18 of FIG. 17;

FIG. 19 is a sectional view similar to FIG. 18 illustrating the air mattress assembly in the platen after a vacuum has been applied to the air mattress assembly;

FIG. 20 is a top plan view showing the air mattress assembly being inserted vertically into a cooling tank;

FIG. 21 is a sectional view illustrating the bonded assembly being severed from its associated frame;

FIG. 22 shows the bonded air mattress being inflated as a final step in the process;

FIGS. 23, 24 and 25 are enlarged sectional views illustrating the top sheet of the assembly and the foam core in detail at three different stages of the process.

DESCRIPTION OF THE PREFERRED EMBODIMENT

It is believed that a clearer understanding of the present invention will be attained by first describing the main components and physical details of the air mattress made by the present invention and then analyzing how these main components interact to provide adequate support for a person resting on the mattress. More specifically, the manner in which the force of the weight of the person acting downwardly on the mattress is transmitted into the mattress structure and resisted thereby will be analyzed with regard to the tension and compression characteristics of the foam and the manner in which these interact in the structure of the air mattress to counteract the force of the person's weight. After such analysis, the process of the present invention will be described in detail.

The air mattress 10 of the present invention has a flat, rectangular configuration and comprises upper and lower skin sections 12 and 14, respectively, which are bonded one to another about their entire perimeter to provide an air impervious envelope enclosing a core 16 of a lightweight, resilient, open cell foam material. As shown in FIG. 4, each of the skins 12 and 14 comprises an outer layer of a substantially non-stretchable fabric 18, desirably about 0.005 inch thick, next an air impervious layer 20, such as a layer of a thermo-setting plastic material, and a third innermost layer of material 22 such as a thermo-plastic resin, to which the foam core 16 can be bonded. The middle thermo-setting layer is desirably about 0.0006 inch thick, and the inner thermoplastic coating is desirably about 0.0034 inch thick. Composite sheets made up of three such layers are commercially available, one such composite sheet being made by Kenyon Piece Die Works Company, Rhode Island, and identified as P.T. 1000.

The foam material which makes up the core 16 is a low density, open cell, resilient foam, desirably made of polyurethane or other suitable material. Its density is desirably no greater than about 1.5 pounds per cubic foot, and desirably in the range of 1.0 to 1.2 pounds per cubic foot, with foams of a density as low as 0.5 pounds per cubic foot also being adequate. While higher density foam (e.g., in excess of 1.5 pounds per cub foot) can function in the mattress 10, as will be disclosed hereinafter, there is no real advantage in going to foams of higher density, and some actual disadvantages. The indentation load deflection (ILD) characteristic of the foam desirably is no greater than approximately 25 pounds for 25% compression, according to the specifications of ASTM-D-1564, and desirably in the range of 6 to 18 pounds. The compression set of the foam material (also according to ASTM-D-1564), should be no greater than 10%, and desirably no greater than 5%. A suitable foam for this application is made by E. R. Carpenter Co., Richmond, Va., and designated R-17. The edge joint or seal 24 at which the two skins 12 and 14 are joined about their entire perimeter is made by bonding the two inner surfaces of the skins 12 and 14 together by means of the thermo-plastic coatings 22, about the entire perimeter of the two skins 12 and 14 to form a "T" joint or seam. There is a valve 25 comprising a thermo-plastic polyurethane housing and a conventional valve member mounted therein.

With the main components of the air mattress now described, the manner in which this air mattress 10 performs its supporting function will now be analyzed, with particular reference to FIGS. 5 through 7. The basic function of an air mattress is to support all, or substantially all, of a person's body on the air mattress upper surface, which surface conforms reasonably to the contours of a person's body so that the application of supporting force is reasonably distributed over an adequate area of contact with the person's body. Thus, the force of the weight of the person's body must be transmitted from the body contact surface portions of the air mattress into the structure of the air mattress to the bottom surface thereof and thence to the underlying ground surface.

With reference to FIG. 5, let it be assumed, as an example, that a person weighing 150 pounds is lying on the air mattress 10 with the contact areas of the person's body pressing down on the top surface of the mattress. The force of the person's body is represented by the downwardly directed arrow at the center of the air mattress shown in FIG. 5. It can reasonably be assumed that approximately two square feet of air mattress is loaded by the body, with the force per unit area against the air mattress being, on the average, approximately 0.5 pounds per square inch. As indicated above, this total 150 pound force, so distributed over a portion of the top surface of the air mattress, must in some manner be transmitted through the structure of the air mattress to the underlying ground. To provide a proper basis for analysis to see how this is done with the present invention, it would be profitable to analyze how this is accomplished in the prior art mattresses.

With regard to the conventional inflatable air mattress that is made up of a plurality of inflatable tubes, the air entrapped within the air mattress becomes pressurized to that the transmission of force is from the top surface portions of the air mattress into the fluid medium in the mattress (i.e., entrapped air) which in turn presses against the lower mattress surface. The skin of this air mattress, which comprises its entire structure, is placed in tension to counteract the pressure of the air entrapped within. Since the tubes of the air mattress seek a circular cross-sectional configuration upon inflation, the tubes themselves do not deform to any significant degree due to internal pressure, which enables the mattress as a whole to resist exterior compression loading since such compression loading causes a decrease in the volume of the mattress and a corresponding increase in pressure.

When one or more of the tubes is compressed, two forces interact to resist the compressive force and thus provide support. First, there is the force of the pressurized air within the tube which pushes the tube skin outwardly. Second, when a surface portion of the tube is pressed downwardly below the level of the surrounding surface portions, there is a "diaphragm effect" of the tension in the surface material of the tube tending to pull the depressed surface portion upwardly. This diaphragm effect can be compared to the effect produced in a fireman's net which provides an increasing supporting force as it is depressed downwardly. Thus even if an air mattress were made in the form of one large pressurized tube, it would provide support because of the two interacting forces. The force is transferred to a flat supporting surface purely by flattening the rounded surface as necessary to react the load applied above.

When instead of using an air mattress, a simple foam pad is used by itself, a different principle is involved. The foam pad is simply loaded in compression at the areas of body contact, with the foam material having (in most instances) adequate resistance to compression to support the various portions of the person's body above the ground surface. Thus, the foam material must have sufficient strength and resistance to compression loading to perform its support function properly. Some prior art foam pads utilize a foam material having a density of, for example, as high as 2.75 pounds per cubic foot to obtain good resistance to compression loading. Reference is now made to the graph shown in FIG. 7, and specifically to curve A, where the percent of deflection in compression is plotted against the unit loading in pounds per square inch of a foam material having a density of 2.75 pounds per cubic foot. It can be seen that where the unit loading is approximately half a pound per square inch, there is approximately 40% compression, and when the loading is as high as one pound per square inch, the foam has compressed to one third its initial height (i.e., 67% deflection).

To turn our attention now to some of the prior art disclosures relating to inflatable mattresses with a foam core with the covers bonded to the foam at least in part, the application of these principles becomes somewhat more complex. For example, in U.S. Pat. No. 2,997,100, Morris, there is the combination of a foam mattress and an enclosing flexible air impervious envelope. It appears from te specification of that patent that the foam core itself is adequate to act as a foam mattress for persons of relatively lighter weight. The inflatable envelope is pressurized in the event that a heavier person wishes to obtain a firmer mattress than would ordinarily be obtained by the foam core by itself. Thus, it appears that the intent of the structure in the Morris patent is to provide a foam structure which has adequate resistance to compression to provide a reasonable degree of support, and an additional inflatable structure which can be pressurized to provide a second increment of supporting force. Apparently, the intended cooperating effect between the two components of this structure is simply to add two components of force in the same direction to provide adequate total supporting force. This patent states that "each cell of the foam is a separate pneumatic member whose pressure may be controlled."

The Swiss Pat. No. 428,124 shows a structure which in principle is intended to function substantially the same as the Morris patent with regard to its ability to provide support for a person, with the added self-inflating characteristic provided by the foam core. Thus, the Swiss patent does recognize that the resistance of the foam to compression will cause a rolled up air mattress to self-inflate when its valve is opened. Then when the valve is closed, the inflated air mattress is intended to provide adequate support in the fashion of a conventional air mattress. Additionally, the patent notes that in the event the air mattress becomes punctured so as to lose its air pressure, the foam material provides resistance to the weight of the person's body to provide at least some reasonable degree of comfort. Thus it is clear from the teaching of the Swiss patent that the inventor intends the foam to have adequate resistance to compression to accomplish appreciable support function. Presumably, to follow the teachings of this Swiss patent, it would be advisable to select a foam material having appreciable resistance to compression, somewhere near the deflection characteristics indicated on curve A of the graph of FIG. 7.

U.S. Pat. No. 3,798,686, Gaiser, also shows a self-inflating air mattress which utilizes a foam core which has sufficient resistance to compression to impart the self-inflating feature to the air mattress. However, it appears that the inventor in this patent does not intend to depend significantly on the compression resistance of the foam to provide its support function. As recited on column 3 of this patent, beginning on line 37, the criss-cross arrangement of the ribs prevents ballooning of the mattress, since these ribs along with the upper and lower pads form a tie between the top and bottom surface of the mattress. Thus, it appears that one function of the foam core is to provide some measure of tension loading in those areas where the upper and lower skins of the mattress tend to move apart and thus undesirably increase the volume of the air mattress. However, the patent also speaks of filling the cells of foam with air to provide a resilient cushion, and while this patent mentions the possibility of a continuous foam pad, it indicates that arrangement is less desirable.

To illustrate the presumed mode of operation in the Gaiser patent, reference is again made to FIG. 7 and specifically to the two curves designated B and C. Curve B represents the percent elongation under tension of a block of foam having a density of 1.1 pounds per cubic foot, with this block being 1 inch by 1 inch in its width dimensions. Curve C represents the deformation characteristics under tension of a block of the same size made of a material of 2.75 pounds per cubic foot of foam. It can be seen that the deformation in elongation is quite close to that of the lighter foam. The deformation characteristics under tension of an elongate foam strip one inch in width is at most only moderately less than those shown in the curves B and C, and for purposes of analysis can be considered nearly the same as those curves. Thus, as a portion of the air mattress in the Gaiser patent is pressed downwardly by a person lying on the mattress so as to increase pressure in the interior of the mattress, the other top and side surface areas of the mattess are pushed or expanded outwardly to a certain extent, the amount of expansion being dependent on the deflection of the foam core under tension loading, such as shown in curves B and C. In other words, the greater the elongation of the foam core material placed under tension loading, the greater the depression of the downwardly loaded portions of the mattress.

The above analyses of the various prior art air mattresses are, as mentioned above, primarily presented as a basis of analysis for the manner in which the mattress made by the present invention overcomes these problems. Therefore, with the above analyses before us, let us now turn our attention to the mode of operation of the mattress made by the present invention.

First, the present invention utilizes a foam having a density no greater than 1.5 pounds per cubic foot, and desirably in the order of 1.0 to 1.2 pounds per cubic foot, or even possibly less. The 25% ILD of the foam, as mentioned earlier herein, should be no greater than 25 pounds and desirably in the range of 6 to 18 pounds. Curve D of FIG. 7 shows the deflection of such foam under compression loading. It can readily be seen that when the loading reaches a value of about 0.2 pounds per square inch, the foam material essentially collapses and continues to compress under very little additional loading until it reaches only one third of its initial volume. Hence, it becomes apparent that while the resistance to compression loading does have some value in providing support to the weight of the person lying on the air mattress, it must be considered a relatively minor factor.

However, the use of a low density foam material having this ILD range has some very desirable characteristics for a self-inflating air mattress. Again, with reference to curve D of the graph of FIG. 7, if the air mattress with the light foam core is rolled up rather firmly so that a compressive force of 0.8 pounds per square inch is applied to the foam, the foam material can be compressed to about 15% of its original volume. On the other hand, if a comparable force is applied to a foam material having a 2.75 pound per cubic foot density in the process of rolling up a pad or air mattress made of such material, it is only compressed down to 40% of its original volume. Also, if it is desired to roll up the air mattress having the low density foam material only to a volume of 40% of its original volume, a much more moderate compressive force need be applied, just slightly in excess of 0.2 pounds per square inch. Yet, it has been found that this low density foam material within the ILD range specified above has sufficient restoring force after being compressed to cause self-inflation of the air mattress within a reasonable time.

It is noted that an essential feature of the mattress made by the present invention is that the lightweight foam core 16 must be bonded to the upper and lower skin surfaces 12 and 14 along substantially the entire horizontal surfaces thereof. As will be discussed more fully hereinafter, such intimate bonding is not required at the extreme edge areas of the foam and envelope. (In fact, it is difficult in a bonding process to obtain bonding in these extreme edge areas.) Further, it is noted that the horizontal dimensions of the air mattress 10 (in the order of about 47 to 78 inches length and 19 to 28 inches width) are quite large relative to the thickness dimension of the foam core 16 (which is about 1.5 inches).

To appreciate the mode of operation of the mattress made by the present invention, it is important to recognize the effect when tensile loading is applied to the foam material over a surface which has relatively large length and width dimensions in comparison to the thickness. To illustrate this, let it be assumed that one section of the upper skin 12, one inch square, is being pulled upwardly so as to place tension on the one inch square of foam immediately below. The individual foam filaments tend to deflect upwardly in the direction of tension and thus pull the adjacent foam elements outside the one inch square inwardly. However, since there is an adjacent tension load, resulting from the tensile loads on the immediately adjacent one inch squares, such lateral pulling of the foam filaments is resisted. Thus, by applying the tensile loads over a substantial surface area, large in both length and width relative to the thickness, there is an internal loading of the foam filaments themselves not only in the vertical axis, but in both the longitudinal and horizontally transverse axes. This three dimensional tensile loading in the internal structure of the foam gives this foam configuration much greater resistance to elongation in tensile loading.

To illustrate this principle graphically, reference is now made to curves E and F of the graph of FIG. 7. As shown in curve E, when a core of foam material such as used in the present invention, of a density of 1.1 pound per cubic foot, is placed in tensile loading of one pound per square inch, the upward deflection is in the order of only approximately 3%. As indicated by curve F, when the density of this same core is increased to as great as 2.75 pounds per cubic foot, the relative deflection of the core material is just slightly less than that of the much less dense material. Thus, it can be seen that while the resistance to compression of the more dense and less dense foam material is substantially different, this is not so with the resistance to tensile loading. Accordingly, when the foam core 16 of the present invention is loaded under tension, by an exterior compressing load being applied in another area of the air mattress 10 resulting in an increase in internal air pressure, there is relatively little upward deflection in the area not having an exterior load applied thereto, in spite of the fact that a relatively low density foam is used. With the foam having these characteristics and with the outer fabric being substantially non-stretchable, there is an adequate build-up of resisting air pressure in the exteriorly loaded area to provide adequate support.

To illustrate this further, reference is again made to the graph of FIG. 7, and specifically to curve G which illustrates the deflection characteristics of the air mattress 10 of the present invention, when inflated only to atmospheric pressure. This test was performed by placing a plate having a surface area of about one square foot on the top surface of the air mattress 10 and progressively loading the plate. Under high unit loading of one pound per square inch, the air mattress deflected downwardly only 40%.

Attention is now directed to FIG. 6 which shows the construction of the edge portion of the air mattress 10. The upper and lower sheets 12 and 14 are, as indicated previously herein, in the form of a "T" joint 26, such that the interior surfaces of the edge portions of the sheets 12 and 14 are bonded together. When the interior of the mattress 10 is pressurized, as in the case of a person lying on the mattress 10, the increase in pressure pushing outwardly against the portions of the skin sections 12 and 14 immediately adjacent the "T" joint 26 causes these sections to be placed under tension and be disposed in a cross-sectional circular configuration. These circular sections are indicated at 28 in FIG. 6. At the areas where these skins sections 28 each begin their inward curve toward the "T" joint 26, the adjacent section of foam, indicated at 30, is actually compressed by the adjacent skin portions. Thus, in that particular area, it is not essential to obtain a strong bond between the foam 16 and the adjacent skin sections, since this particular joint construction alleviates the tendency for that area of the skin section to pull apart from the foam.

This is particularly significant in accomplishing reliability of structure, since there is a tendency, in the circumstance where a small area of non-bonding or delamination occurs in an area where the skin is tensioned outwardly, for this delamination to spread progressively, even under moderate pressure. As the unbonded area spreads outwardly, the delaminating force at the edge of the delaminating area increases. However, the structure of the joint, as shown in FIG. 6, and the manner in which this joint is made in the process of the present invention (to be described hereinafter) alleviates this particular problem in the edge area of the mattress 10. It also significantly decreases the cost of manufacture by not requiring bonding to the edges of the core. Also, the rounded configuration of the edge skin portions 28 prevents any outward bulging at the side edges of the mattress to enhance the support function of the mattress since this is the rounded configuration the skins 12 and 14 seek due to internal air pressure.

To summarize the manner in which the mattress 10 made by the present invention functions, when the mattress is in its rolled up stowed position and the valve 25 is opened, the foam core 16 causes the mattress 10 to self-inflate, after which the valve 25 is closed. When a person lies on the mattress 10 so that the upper skin 12 is compressed by local loading of the person's body, the portion of the lower skin 14 opposite the loaded area of the upper skin 12 is allowed to press downwardly, in reaction to internal air pressure, to react the load applied above to the underlying ground surface. In the other horizontal portions of the mattress 10, the skins 12 and 14 are held in relationship to each other by the tensile loading in the foam 16. At the perimeter portion 26 of the mattress 10, the skins 12 and 14 are already in the rounded configuration that they tend to seek upon internal pressurization. Thus, as there is downward deflection of the loaded portion of the skin 12, there is an increase in internal pressure of a magnitude sufficient to provide comfort, even though the mattress is relatively thin in its vertical dimensions. It is important to note it is the tension resisting characteristics of the foam core 16 in combination with the already rounded configuration of the mattress perimeter portion 26 that resists any tendency for the exteriorly unloaded portions of the mattress 10 to increase any significant extent in internal volume, which permits a sufficient build-up of pressure under only moderate downward deflection to provide adequate support.

The process of the present invention will now be described with reference to FIGS. 8 through 25.

As shown in FIG. 8, a first rectangular sheet 40 (which is to be skin 14 of the finished air mattress 10), having a length and width moderately greater than the sheet 14, is placed on a first lower section of a rectangular frame 42. The sheet 40 is stretched moderately over the frame section 42, with the edges of the sheet 40 being pushed down over occasional peripheral spikes 44. Hinged clamping portions 46 of the frame 42 are then swung over to push the sheet 40 over the remaining spikes and hold the sheet 40 securely in place. A valve housing 48 is placed in one inside corner section of the frame 42. To hold this valve housing 48 securely in place during the bonding process and to permit passage of air therethrough, a locating tube 50 is inserted through the housing 48, and this tube 50 is itself mechanically held in its proper position.

Next, as illustrated in FIG. 12, the frame section 42 is located between stationary support blocks 52 so as to be properly positioned thereby. Slide mounted locating blocks 56 are moved inwardly to an adjusted position to locate a foam core 54 centrally with respect to the lower frame section 42 and held in place by appropriate means. A rectangular section of a sheet of foam material 54, one and one-half inches thick, is placed on top of the sheet 40, and the sides of the foam material are held straight by contact with the slide mounted locating blocks 56 to assure straight sides on the finished product. All four corners of this sheet are trimmed, one to accommodate the valve housing 48 and the others to provide a rounded corner to the mattress.

The operation illustrated in FIGS. 9 through 12 is repeated a second time, with the upper sheet 62 (which is to be the skin 12 of the finished air mattress 10) being mounted to a second frame section 64 similar to the frame section 42. This upper frame section 64 is inverted with respect to the lower section 42 and placed on top of the section 42. Bolts 66 are inserted through matching holes in the sections 42 and 64 to properly align these two sections 42 and 64 and hold them securely together. With reference to FIG. 13, it will be noted that the upper surface of the foam material 54 is moderately above the upper surface of the guide blocks 56. Thus, as the upper frame section 64 is lowered downwardly in proper alignment with the lower section 42 by means of appropriate vertical guides (not shown herein for simplicity of illustration) the upper skin section 62 engages the top surface of the foam material 54 to prevent the foam material 54 from shifting laterally.

Thereafter, the guide blocks 56 can be retracted without disturbing the straight line of contact between foam 54 and fabric sheets 40 and 62, to permit the upper section 64 to be lowered further and then clamped to the lower frame section 42.

FIG. 15 illustrates the cross-sectional edge configuration of the frame 42-64 as finally assembled and ready for further processing. With reference to FIG. 9, it is noted that the upper inside edge of the frame section 42 has a small peripheral lip 68. When the two frame sections 42 and 64 are pressed together, these two lips 68 push the adjacent sections of the skins 40 and 62 tightly together, as shown in FIG. 15. It will be noted that the outer edge of the foam material 54 (which is to become the core 16 of the air mattress 10) is spaced moderately inwardly from the inner edge of the frame sections 42-64, so that there are two upper and lower edge skin sections 70 and 72, respectively, positioned beyond the end edge of the foam material 54.

FIG. 16 illustrates the manner in which the valve housing 48 with its locating tube 50 remains in the frame assembly illustrated in FIG. 14. The foam core 54 has a corner portion cut away to accommodate the valve housing 48 and permit proper passage of air into and out of the mattress. This frame assembly, comprising the two frame sections 42 and 64, contained therebetween is then moved to a hot press 74 made up of upper and lower heated platens 76 and 78, respectively. Each of the platens 76 and 78 comprises a main planar section or plate section 80, and a peripheral rim portion 82. Each of the two rim sections 82 project about one-eighth inch beyond the contact surface of its adjacent plate sections 80. Thus, if the two platens 76 and 78 were moved into contact with one another so that the perimeter portions 82 were in contact, there would be a cavity defined by the two plate sections 80 having a thickness of about one-quarter of an inch.

The frame assembly 42-64 with the air mattress components mounted thereto is moved into position in the press 74, so that the skin edge portions 70 and 72 are positioned between the platen perimeter portions 82. The two platen sections 76 and 78 are maintained at a temperature of about 320° to 360° F.

The upper platen 76 is moved downwardly so that the platen perimeter portions 82 engage the outer skin portions 70 and 72, and the platen plate portions 80 press against the upper and lower skins 40 and 62. As disclosed previously herein, each of the sheets 40 and 62 has an inner layer of a thermoplastic material which softens under heating. There is also an intermediate layer of a thermo-setting material or higher melting temperature thermo-plastic material which does not soften under heating and thus remains as an air impervious layer. The resistance of the foam 54 to compression causes the individual filaments of the foam material 54 to protrude into or become interengaged with or bonded to the inner thermoplastic layer of each of the sheets 40 and 62.

This effect is illustrated in FIGS. 23 and 24, wherein there is shown the upper skin 62 having a top fabric portion 86, an intermediate layer of a thermo-setting or higher melting temperature thermo-plastic resin 88 and an innermost layer of a thermo-plastic material 90. The configuration shown in FIG. 23 is representative of the arrangement of the skin 62 and the foam material 54 prior to compression in the press 74. When the heated platen is applied to the frame assembly, as shown in FIG. 24, the upper platen plate 80 compresses the foam material 54, and also heats the skin 62 so as to soften the inner thermo-plastic layer 90. It can be seen that the foam filaments 92 adjacent the skin 62 protrude into the softened layer 90, but do not penetrate the intermediate layer 88. The two platens 76 and 78 are pressed against the upper and lower skin sections 62 and 40 in this manner for about fifteen seconds. This time period is adequate for the heat from the platen to soften the thermo-plastic layer 90 and permit proper penetration of the filaments 92 into that layer 90, but not so long a time as to excessively heat the main body of the core material 54.

After this initial fifteen second pressing and heating period, a vacuum hose 94 is attached to the tubular locating stem 50 so as to draw a vacuum in the interior of the air mattress assembly. The vacuum is drawn down sufficiently to hold the foam compressed and the fabric edges together, so that atmospheric pressure is sufficient to actually unload the upper and lower skin sections 62 and 40 from the two plate sections 80 of the platens 76 and 78. This effect is illustrated in FIG. 19. This application of a vacuum applies further force, in the form of atmospheric pressure, against the upper and lower skin sections 62 and 40 to maintain penetration of the filaments 92 into the thermo-plastic layers 90. Additionally, this application of the vacuum unloads the two plate sections 80 so that the force of the two platens 76 and 78 against one another is exerted at the perimeter portions 82. This insures that the two edge sections 70 and 72 are bonded securely to one another. The vacuum should not be applied with too much force since excessive pressure differential could cause holes to form in the plastic coating. The total time period in this second vacuum bonding phase is approximately fifteen seconds, including the period of drawing the vacuum, after which the upper platen 76 is raised, and the air mattress assembly is removed from the heating press 74. Thus the total dwell time of the air mattress assembly in the platen is approximately thirty seconds. When the heated assembly is removed from that platen, the vacuum maintains the hot skins in contact with the compressed foam until the bonding layer can be cooled. Also, the vacuum prevents the foam from expanding and separating the skins at the still hot bond line around the edge until it can be cooled. The outer edges of the skin bond area have no tendency to peel because they are held together by the two frames which are fastened together.

Immediately after removal of the air mattress assembly from the heating press 74, a cooling medium is applied to the two skin sections 40 and 62. This is conveniently accomplished by immersing the whole assembly vertically into a tank of water or by wetting with sponges full of water, or by cooling with cool or moist air. The wetting, which is accomplished in a matter of a few seconds, is adequate to cool the inner thermo-plastic layers 90 of the skins 40 and 62 so as to bond the filaments 92 therein. Immediately after the air mattress assembly is cooled, the vacuum is released and a pressure hose is attached to the locating stem 50. The interior of the air mattress is pressurized to approximately 1 to 3 pounds per square inch gauge.

The immediate effect of so pressurizing the interior of the air mattress assembly is to tend to push the two skins 40 and 62 away from each other so as to place the foam core 54 in tension loading. Since the bonding of some of the filaments 92 to the thermo-plastic layer 90 are deep in the surface of the foam or are weak, such weaker or unwanted bonds are broken while the relatively strong bonds on the outer surface of the foam remain. In FIG. 25, these weaker bonds which are broken are indicated at 96, with the stronger bonds being indicated at 98. If these weaker or unwanted bonds are not broken, when a person lies on the mattress there is an undesired crackling noise as these bonds are broken from time to time. This initial pressurization is maintained for about one minute. Another effect of this immediate pressurization is to improve the extension set or loft of the foam while the foam is at an elevated temperature. The reason for this is that unwanted bonds, where the foam filaments are imbedded too deeply into the thermoplastic layer, tend to diminish the proper loft of the foam, and these are broken by this initial pressurization.

While the air mattress is pressurized, the air mattress assembly is placed on a cutting frame 102 as illustrated in FIG. 21. This cutting frame has a peripheral upstanding flange 104 that underlies the peripheral bonded skin portions 106 of the upper and lower sheets 62 and 40. This bonded edge section 106 is cut by a knife 108, so as to separate the mattress components from the frame sections 42–64, after which the pressure hose is removed from the stem 50, and a valve element is inserted into the valve housing 48 to make the valve assembly 25.

The air mattress, at this stage of the process designated 110, is then pressurized a second time to about 1 to 3 pounds per square inch gauge, and the valve closed to maintain this pressure. This pressure is maintained for a prolonged period (a day or so), after which this pressure is released. By so pressurizing the mattress, two things are accomplished. First, the moderately heated foam core material 54 is maintained in its properly expanded position while it is cooling back to normal temperature and taking its permanent set. Secondly, this pressurizing acts as a quality control technique to determine if the mattress has any leaks.

As a modification in the process described above, it is possible to use a fabric coating where the intermediate layer 88 and inner layer 90 could both be made of the same thermo-plastic material which has a gradual softening characteristic with temperature increase. Thus, by properly selecting the time and temperature to accommodate the compression forces applied to the foam, the penetration of the foam filaments 92 into the thermoplastic layer is controlled so that the filaments do not destroy the air impervious characteristics of the skin sections 40 and 62. In effect, there is in the end product an inner layer in which the foam filaments 92 are bonded and an intermediate air impervious layer, with little, if any, penetration of the foam filaments 92 therein.

Thus, the process of the present invention provides a finished product having the structural and functional features imcorporating the inventive features of the air mattress of the present invention.

What is claimed is:

1. A method of making a self-inflating air mattress comprising an envelope of upper and lower sheets bonded to one another, and a foam core having upper and lower surfaces securely bonded over substantially their entire surface areas to the upper and lower sheets, said method comprising:
  a. placing a planar piece of open cell foam core material between upper and lower sheets to form a pre-bonded assembly, said sheets being air impermeable and having an inner bonding layer of a thermo-plastic material,
  b. simultaneously heating and compressing said assembly to compress the foam core between the sheets and soften the layers of thermo-plastic material to permit propr interengagement thereof with said foam, and to bring said assembly to an elevated temperature,
  c. cooling said sheets and foam core portions immediately adjacent thereto only for a period of time necessary to cause a secure bonding of the foam to the upper and lower sheets to form a bonded assembly, and
  d. pressurizing the foam core to a pressure above ambient pressure by introduction of pressurized fluid therein immediately after cooling to apply an expanding force between the upper and lower sheets to break undesired weak foam filament bonds to said sheet and to enhance loft of said foam core.

2. The method as recited in claim 1, wherein
  (a) edge portions of the sheets of the pre-bonded assembly are clamped in a perimeter frame to form a frame assembly, said heating and compressing being accomplished by placing said frame assembly between platens, and said cooling being accomplished after disengaging said frame assembly from the platens,
  (b) a vacuum is applied to said envelope prior to disengaging said assembly from said platens and cooling the sheets, and said vacuum is maintained while the sheets are being cooled.

3. The method as recited in claim 2, wherein the bonded assembly is separated from the frame assembly after said assembly has been cooled by cutting the perimeter portions of the sheets within the frame while said foam core is pressurized.

4. The method as recited in claim 3, wherein the perimeter portions of the two sheets in the pre-bonding assembly extend moderately beyond the foam core, and during the heating and compressing of said sheets, the perimeter portions of the two sheets are pressed against each other to form a perimeter "T" joint of the envelope.

5. The method as recited in claim 4, wherein said heating and compressing of the sheets toward one another to compress the foam and the joining of the perimeter portions of the sheets is accomplished by applying to the sheets heated platens, at least one of which has a moderately raised perimeter shoulder portion, and a moderately recessed planar portion enclosed within the shoulder portion.

6. The method as recited in claim 5, wherein subsequent to initial engagement of said pre-bonding assembly by said platens, a vacuum is applied between said two sheets so as to unload said sheets from the platens, and cause greater pressure engagement of the shoulder portions of the platen with the perimeter portions of the sheets.

7. A method of making a self-inflating air mattress comprising an envelope of upper and lower sheets bonded to one another, and a foam core having upper and lower surfaces securely bonded over substantially their entire surface areas to the upper and lower sheets, said method comprising:
  a. placing a planar piece of open cell foam core material between upper and lower sheets to form a pre-bonding assembly, said sheets being air impermeable and having an inner bonding layer of a thermo-plastic material, with perimeter portions of said sheets extending moderately beyond the perimeter of the core,
b. simultaneously heating and compressing said assembly to compress the foam core between the sheets and soften the layer of thermo-plastic material to permit proper interengagement thereof with said foam, and to compress the perimeter portions of said sheets against one another to form a perimeter "T" joint so as to form an impervious envelope,
c. applying a vacuum to the interior of said envelope so as to unload said sheets from the compressive force applied thereto and cause greater pressure engagement of the perimeter portions of the sheets,
d. cooling said sheets and foam core portions immediately adjacent thereto only for a period of time necessary to cause a secure bonding of the upper and lower sheets to the foam core and to each other to form a bonded assembly,
e. pressurizing the foam core to a pressure above ambient pressure by introduction of pressurized fluid therein immediately after cooling to apply an expanding force between the upper and lower sheets to break undesired weak foam filament bonds to said sheet and to enhance loft of said foam core.

8. The method as recited in claim 7, wherein edge perimeter portions of the sheets of the pre-bonded assembly are clamped in a perimeter frame to form a frame assembly, said heating and compressing being accomplished by placing said frame assembly between platens, and said cooling is accomplished after disengaging said frame assembly from the platens.

9. The method as recited in claim 7, wherein said heating and compressing of the sheets toward one another to compress the foam and join the perimeter portions of the sheets is accomplished by applying to the sheets heated platens, at least one of which has a moderately raised perimeter shoulder portion, and a moderately recessed planar portion enclosed within the shoulder portion.

10. The method as recited in claim 9, wherein the heating and compressing of the sheets toward one another to compress the foam and join the perimeter portions of the sheets is accomplished by applying to the sheets heated platens, both of which have a moderately raised perimeter shoulder portion, and a moderately recessed planar portion enclosed within the shoulder portion.

* * * * *